United States Patent Office 3,291,906
Patented Dec. 13, 1966

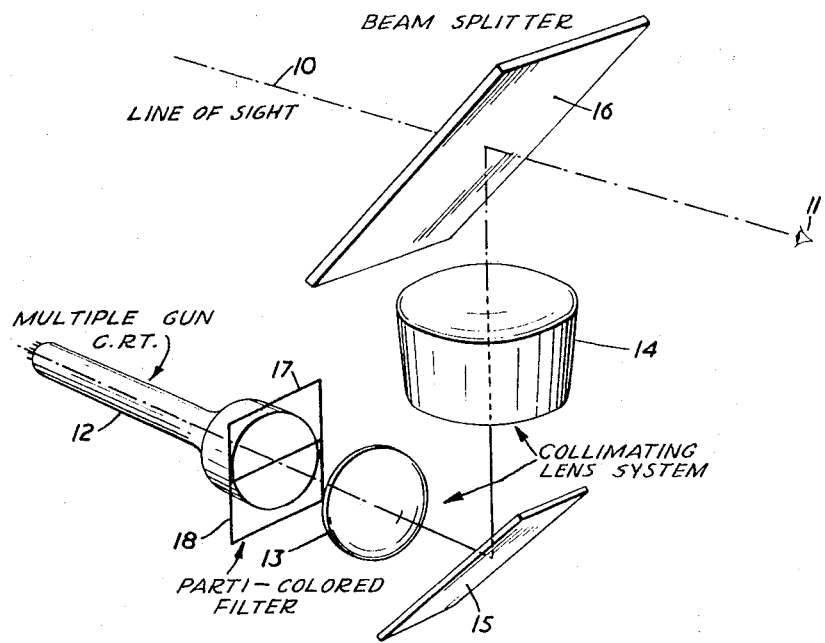

3,291,906
AIRCRAFT VISUAL INDICATING OR DISPLAY SYSTEMS UTILIZING A CATHODE RAY TUBE
John Joseph Ward, Maidenhead, and Brian Dennis McCarthy, Catford, London, England, assignors to Specto Limited
Filed May 1, 1963, Ser. No. 277,394
2 Claims. (Cl. 178—7.85)

This invention relates to indicating or display systems of the kind in which means are provided for superimposing the images from two observation or image systems. For example, one system may be a direct observation system, including optical elements, and the second image system may comprise a means for providing images which can be superimposed on the field of view of the first system. One example of the use of such a display system is on aircraft or the like, in which there may be imposed on the line of sight of the pilot images representing information concerning the navigation or condition of the aircraft. The present invention has for its objective to provide an improved system of this kind.

The invention consists of a display system comprising a semi-transparent and semi-reflective element disposed upon a first optical axis, a cathode ray tube, said cathode ray tube having a screen for the display of information thereon, and means for directing light from said screen onto said element and thence onto said axis, said cathode ray tube including means for providing a plurality of discrete distinguishable images on said screen.

Features and advantages of the invention will appear from the following description of one embodiment thereof, given by way of example, in conjunction with the accompanying drawing, which is a simplified, diagrammatic perspective view of an image producing system.

In the form of the invention shown in the drawing, the axis 10 is the axis of a first viewing or observation system by means of which an observer at 11 can observe a first phenomenon. For example, this system may be an optical one by which the observer can observe a naturally occurring event. Accordingly, there may be associated with this first system such optical elements as may be suitable. As an example, this first observation or viewing system may be the line of direct vision of the pilot of an aircraft. Means are also provided whereby an image appearing on the screen of a cathode ray tube can be superimposed in the field of view of the optical system on axis 10; in the example mentioned above, the information displayed upon the tube screen may be navigational information, or information concerning the state of the aircraft or its equipment or other information of assistance to the pilot in flight. The desired superimposition is produced by means including lenses 13 and 14, a mirror 15 and a beam splitting semi-silvered mirror 16, the latter being interposed in the optical system on axis 10. If a natural event is being observed by the observer at 11, it is convenient if the image produced by the optical system 13, 14, 15 and 16 should appear at infinity. Where the system is for use on an aircraft this is advantageous since it enables the pilot to perceive the information without moving his head, a line of sight, and without refocussing his eyes. In other applications of the system, it is similarly possible for the observer at 11 to perceive the event that is occurring, whilst having in the field of view additional information, which may be numerical or scientific data pertaining to the event being observed.

With the arrangement as thus described, there is a limitation imposed upon the nature and number of the images appearing on the screen of the cathode ray tube that can be simultaneously displayed to the observer. Accordingly, to increase the facilities offered by the system, and its versatility, means are provided for increasing the number of images which can be simultaneously viewed. Thus, a cathode ray tube can be used that employs multiple electron beam assemblies for producing the images, simultaneously viewable on different regions of the screen. Thus, there can be used a cathode ray tube 12 having multiple guns within a common envelope, with separate beam deflection means. Multiple-gun cathode ray tubes of this kind are well known in the art. By such an arrangement it is possible to have different writing speeds for the guns, and to distinguish between the different images produced by the different guns, it is possible to colour the images by the use of appropriate phosphors on the different regions of the screen of the tube, to use on or more optical filters, 17, 18 over one or more of the different regions of the screen. Also it may be that the use of a multiple gun tube in this way can provide a stand-by facility; should it be that for any reason one gun of the tube should fail, the display can be switched from the defective gun to that which continues to operate.

It will be understood that the use of the mirror 15 is merely of convenience, so as to enable the optical system in which it is included to be more compactly arranged. If lenses 13 and 14 are coaxial the mirror can be dispensed with.

I claim:
1. In an aircraft, a display apparatus for presenting to a pilot a display of flight instrument information superimposed on his line of sight forward of the aircraft, said apparatus comprising a screen, a partly reflecting mirror disposed in said line of sight to direct light from said screen into said line of sight, collimating means interposed between said screen and said mirror, a plurality of writing means for tracing respective component images of the display on different regions of said screen, and means for rendering visible and distinguishing the images from different regions.

2. In an aircraft, a display apparatus for presenting a visual display to a pilot superimposed on his line of sight forward of the aircraft, said apparatus comprising a cathode ray tube having a screen and means for generating a plurality of electron beams for impinging on said screen in different regions thereof, said screen bearing different phosphor materials in said different regions for producing light of respective colors on energization by the corresponding electron beam, a partly reflecting mirror disposed to direct light from said screen along said line of sight, and collimating means interposed between said screen and said mirror.

References Cited by the Examiner

UNITED STATES PATENTS

| | | | |
|---|---|---|---|
| 2,470,666 | 5/1949 | Suffield | 178—7.85 |
| 2,603,706 | 7/1952 | Sleeper | 178—5.2 |
| 2,621,555 | 12/1952 | Fleming-Williams et al. | 178—7.85 X |
| 2,950,340 | 8/1960 | Compton et al. | 178—6 |
| 3,059,519 | 10/1962 | Stanton | 178—7.85 X |
| 3,071,706 | 1/1963 | Waldorf | 178—5.4 X |
| 3,170,979 | 2/1965 | Baldwin et al. | 178—7.85 X |

DAVID G. REDINBAUGH, *Primary Examiner.*

R. RICHARDSON, *Assistant Examiner.*